(No Model.)
H. C. McCARTY.
SEALING CAP FOR AIR BRAKE COUPLINGS.
No. 529,290.  Patented Nov. 13, 1894.
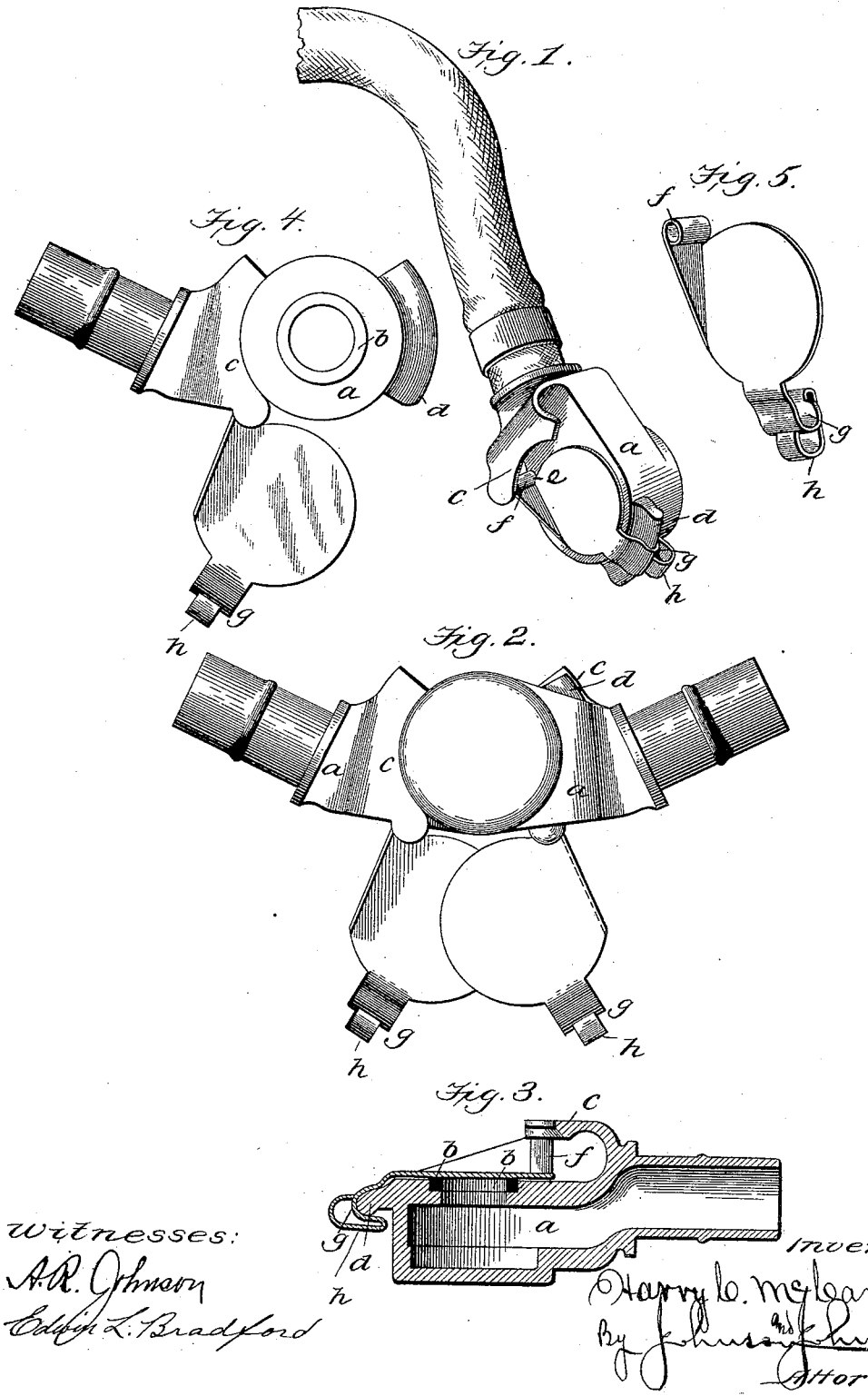

UNITED STATES PATENT OFFICE.

HARRY C. McCARTY, OF WILLIAMSPORT, PENNSYLVANIA.

SEALING-CAP FOR AIR-BRAKE COUPLINGS.

SPECIFICATION forming part of Letters Patent No. 529,290, dated November 13, 1894.

Application filed April 24, 1894. Serial No. 508,861. (No model.)

*To all whom it may concern:*

Be it known that I, HARRY C. MCCARTY, a citizen of the United States, residing at Williamsport, in the county of Lycoming and State of Pennsylvania, have invented a new and useful Improvement in Sealing-Caps for Air-Brake Couplers, of which the following is a specification.

In railway cars using air-brakes the care of the coupling hose is an important matter. Cars are now run with the coupling ends of the air-brake hose dragging and getting in them dirt and cinders in passing over cinder piles and when the hose are coupled the dirt and dust will be blown through the pipes by the force of the air in applying the brakes, and gum and clog the valves and cylinders, cutting and injuring the parts. To avoid this objection provision has been made for hanging up the hose by dummy couplings applied to the car and serving also as a cap to seal the coupler opening. Serious objection results from the hanging up of the hose, as it causes the hose to kink and break or crack near the pipe connections, which in time destroys the hose, and especially when the hose becomes frozen so that when straightened it is weakened and cracks. The manner or location in which to hang the hose is an important consideration, especially if it requires the trainmen to get under the drawbars to hang up and unhang the hose in coupling.

My improvement dispenses with hangers and provides a simple cap device for sealing the coupling and permits the hose to hang in the position in which it will last the greatest length of time and maintain its efficiency as a factor of safety. This attachment is a cap loosely mounted on the coupling itself and constituting a part of it in position to be easily and quickly swung to cover the opening and seal it at the time the hose is uncoupled, leaving the hose freely hanging and tightly closed against the entrance of dust and dirt and can be as easily and quickly opened in coupling the hose.

It will be understood that my invention is not limited to any particular way of mounting the cap so long as it is hung as an attachment directly upon and engaged with the coupling and has a swinging movement thereon to close and to open it by a movement swinging edgewise across the sealing face of the coupling as a means for excluding dirt and dust from the air-pipes.

In the accompanying drawings: Figure 1 shows the hanging end of an air brake coupling hose having my sealing device in its closed position. Fig. 2 shows the hose ends coupled and the sealing cap of each coupling part hanging in open positions. Fig. 3 is a section through one of the coupling parts with its sealing cap closed. Fig. 4 is a face view of the same with the sealing cap open; and Fig. 5 shows the sealing cap.

The coupling is of the style used on the Westinghouse brakes, and is composed of two detachable parts, one on each end of the air brake hose of each car and each part having a construction adapted to be engaged and locked in connecting the air pipes of the cars. Each coupling part forms a chambered section $a\ a$, the inner flat face of which has a circular opening which is provided with a projecting packing ring or gasket $b$, which, when the coupling parts are engaged with their faces in juxtaposition, form a communication between the chambers and their connecting hose of the brake-pipes. Each coupling part is formed with a lug or hook-flange $c$ standing out from and parallel with its open face and with a lug or hook-flange $d$ at the opposite end of the chambered section. Each lug or hook-flange has the form of a segment concentric with the gasket, standing parallel with the joined faces of the sections, and adapted to engage each other when coupled. At one end of each segmental lug there is a pin $e$, which serve as stops to hold the coupling parts with their gaskets in contact under pressure induced by the connecting lugs or hooks to maintain an absolute tight joint. I utilize these stop pins as pivots on which to mount the sealing cap of each coupling part, so that the cap will swing at right angles to the opening and against the gasket under sufficient pressure to make a close joint therewith. This position of the cap also allows it to swing to one side out of the way in coupling the ends of the hose. I prefer to make the cap of sheet steel pressed with a pintle-eye $f$ to fit on the stop-pin $e$, and with a return bend $g$ adapted to fit over and engage the flange $d$ and clamp the cap upon the gasket and hold the cap closed.

I prefer to form the locking end of the cap with a second bend to form a thumb piece $h$ by which to close and open the cap.

As the pintle-hinge of the cap is eccentric to the gasket, the clamping end of the cap will close upon the lug in an arc concentric with the said hinge and abutting upon said lug, and thereby form a stop to limit the closing movement of the cap and hold it securely in such position as seen in Fig. 1. The hinging of the cap to the stop-pin also gives the advantage of allowing the cap, when not in use, to hang down below the coupling so as not to interfere with the coupling action or with the functions of the stop-pins in holding the coupling parts together. The caps can be easily applied to the stop-pins of hose-couplings now in use; and while I have shown and prefer to hinge the sealing cap upon the stop-pin and to secure it to the end lug when in its sealing position, yet it is obvious that the cap may be hinged in a different way on the coupling-part and adapted to be swung over and close its opening.

By making the sealing cap of flexible material it is allowed to yield slightly when brought in contact with the gasket and in forcing the bent end $g$ over the flange $d$ thus permitting the pressure to be exerted upon the cap and gasket which effects and maintains a close contact of the cap to compress the gasket and seal it.

While I have described the sealing cap as applied to the air-brake hose-coupling, it may also be applied to the hose coupling of the signal.

I claim as my improvement—

1. The herein described detachable hose-coupling, consisting of two parts, each the counterpart of the other, each having a side opening provided with a sealing gasket, and a sealing cap pivoted to said coupling part in such relation to said opening as to seal and to unseal the same by a movement swinging edgewise across the sealing face of the said gasket, the said cap being so mounted that it will exert a sealing pressure, in closing upon the gasket, at right angles to its line of movement, for the purpose stated.

2. In a detachable hose coupling, a sealing-cap hinged upon the stop-pin of the coupling-part and secured when closed to the segmental lug of said coupling-part.

3. In a detachable hose coupling, a sealing-cap formed with a pintle-eye adapted to be applied to the stop-pin of the coupling-part, and a thumb piece adapted to engage the end lug of said coupling-part whereby said cap is both hinged and locked to parts of the coupling-section.

4. In a detachable hose coupling for air-brakes, the combination, with the coupling-part having a yielding sealing gasket for the fluid opening, of a spring-cap pivoted upon said coupling part at the side of said gasket, and adapted at its free end to engage said coupling-part and by its spring function to close upon said gasket and seal the fluid opening when the hose are uncoupled.

HARRY C. McCARTY.

Witnesses:
Thos. J. M. Laird,
James Mausel.